Nov. 16, 1971      C. L. YOUNG      3,620,037
COMPRESSOR RESET DELAY CIRCUIT
Filed July 2, 1970
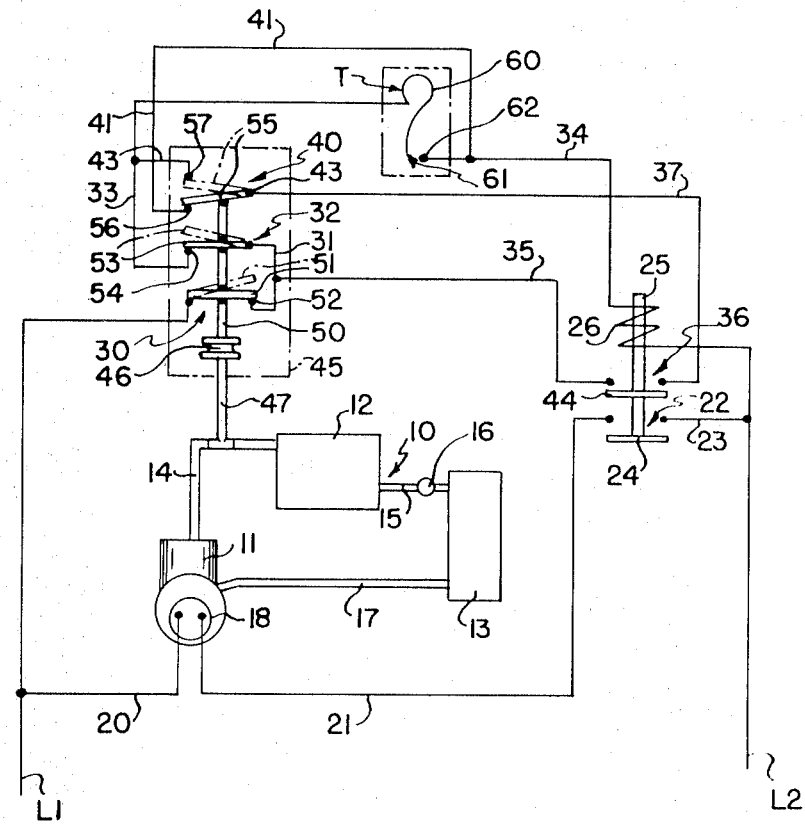
INVENTOR.
CLYDE L. YOUNG
BY
*Watts, Hoffmann, Fisher & Heinke*
ATTORNEYS

3,620,037
COMPRESSOR RESET DELAY CIRCUIT
Clyde L. Young, Columbus, Ohio, assignor to Ranco
Incorporated, Columbus, Ohio
Filed July 2, 1970, Ser. No. 51,931
Int. Cl. F25b *41/00*
U.S. Cl. 62—158                                      6 Claims

ABSTRACT OF THE DISCLOSURE

An electric motor driven refrigerating system for air conditioning a room or the like is controlled by a solenoid operated contactor. The solenoid circuit is controlled by a thermostatic switch, subjected to the air of the room, and a refrigerant head pressure operated switch so that the solenoid is energized by closing of the thermostatic switch only in the event a relatively low head pressure exists in the refrigerating system. The pressure switch is shunted out of the solenoid control circuit by a holding circuit closed by the solenoid during normal operating refrigerant pressures at which the switch is open. To prevent interruption of the solenoid circuit by possible "chattering" of the thermostatic switch contacts during initial closure thereof, the solenoid holding circuit is shunted around the thermostatic switch by a pressure operated double throw switch at relatively low refrigerant pressures and operates upon attainment of a normal refrigerant pressure in the system to connect the thermostatic switch in series with the solenoid circuit.

BACKGROUND OF THE INVENTION

The present invention relates to a control system for an electric motor driven compressor-condenser-expander type refrigerating system controlled by a condition responsive switch, such as a thermostat subjected to air influenced by operation of the refrigerating system. In refrigerating systems of the type mentioned, in the event of an interruption in the operation of the system it is desirable to delay restarting of the system until the head pressure on the compressor has subsided to a degree which will not impose an undue starting load on the compressor motor. The desirability of delaying restarting of the compressor motor generally arises after a momentary power interruption during normal operation of the system. The power interruptions may be in the primary power source or they could arise by manual manipulation of the condition responsive switch. In either event, if the duration of the power loss is of such short period that the pressures within the refrigerating system cannot become sufficiently equalized or reduced overloading in starting of the compressor motor is likely to occur.

Is has been proposed heretofore to provide timer driven delay switches in the control circuits of the refrigerating systems which are arranged to impose a predetermined time delay between the stopping and starting of the refrigerant compressor. These devices are relatively costly to install and maintain, and they are not entirely trouble-free.

Another proposed solution to the problem has been to provide a control system for a refrigerating system of the type mentioned in which a switch responsive to the refrigerant pressure on the high side of the system must be closed by a reduction in head pressure in order for the system to be started and which switch opens when the refrigerant pressures in the system reach a normal operating pressure. It has been found that one disadvantage of the type of control just mentioned is that when the refrigerating system is controlled by certain types of relatively sensitive switches, such as a thermostatic switch, there is apt to be relatively rapid making and breaking of the circuit or "chattering" of the switch contacts at the switch closing temperature. This chattering causes frequently repeated interruptions in the control circuit and the compressor motor is repeatedly and rapidly started and stopped until the thermostatic element produces sufficient force to maintain the contacts closed. This condition places strain and wear on the equipment and results in erratic and noisy operation of the refrigeration system.

It is an object of the present invention to provide an improved control system for refrigerating systems of the type mentioned in which the refrigerant compressor motor cannot be energized until the refrigerant head pressures are sufficiently reduced to permit normal starting of the motor and which control system maintains the refrigerant motor energized although the control or thermostatic switch may chatter during the motor starting phase of its operation.

THE INVENTION

The invention comprises the provision of a switching device operated by an electrically energized power element, such as a solenoid, for controlling operation of the compressor motor of a refrigerating system, the energization of the power element being initially established by a condition responsive switch and a first switch connected in series thereunto, the power element being maintained energized by holding circuit means including a holding switch closed in response to energization of the power element and operative to by-pass the first switch, the holding circuit means also including a first alternative circuit around the condition responsive switch and a second alternative circuit through the condition responsive switch, the alternative circuits including second and third switches respectively, for selectively rendering the alternative circuits operative and inoperative, the first switch being closed when the refrigerating system is in condition to facilitate starting of the compressor and opened when normal operating conditions prevail in the system whereby the power element can only be initially energized when the refrigerating system is in a condition favorable for starting, and the second and third switches being operative in synchronism with the first switch to open the first alternative holding circuit and close the second alternative holding circuit prior to closing of the first switch, and operative to open the first alternative holding circuit and close the second alternative holding circuit in response to normal operating conditions in the refrigerating system whereby instability of the condition responsive switch in its initial closure is ineffective to interrupt energization of the power element.

RELATED CASES

The present invention is an improvement on the invention disclosed in Ser. No. 851,558, now abandoned filed Aug. 20, 1969.

Other objects and advantages of the invention will be apparent from the following description of the accompanying drawing in which an air conditioning system embodying a preferred form of the invention is shown schematically.

Referring to the drawing, a compressor-condenser-expander type refrigeration system is shown at 10 which comprises an electric motor driven compressor 11, a condenser 12 and a refrigerant evaporator 13. The discharge of the compressor 11 is connected by a conduit 14 to the condenser 12. Condensed refrigerant is directed to the evaporator 13 through a conduit 15 and an expansion valve 16. Vaporized refrigerant is returned to the intake of the compressor through a conduit 17. Refrigeration systems of the type mentioned are well known and further description is unnecessary to the understanding of this invention by those familiar with the art. In the embodiment shown, it may be assumed that the evaporator is arranged to cool air which is circulated to a room, not shown, and the operation of the refrigerating system is controlled by a room thermostat T to maintain the room temperature at a given level.

Electrical power is furnished to the compressor motor 18 from a suitable commercial power line L1, through a wire 20 to motor 18, wire 21 to one side of a contactor switch 22, switch 22, and wire 23 to power line L2.

The contactor switch 22 includes a bridge contact 24 which is attached to an armature 25. An electrically energized power element comprising a solenoid 26 is arranged to attract the armature 25 upwardly when the solenoid is energized an thereby close the motor circuit through the switch 22. When the solenoid 26 is deenergized the contact 24 drops from the contacts of the switch 22 to open the motor circuit, as seen in the drawings.

The circuit for initially energizing the solenoid 26 includes line L1, a high pressure cut-out switch 30, wire 31, pressure switch 32, wire 33 to one terminal of a switch comprising the room thermostat T, wire 34 to one side of the solenoid 26. The other side of the solenoid 26 is connected to line L2.

The circuit for solenoid 26 is arranged to be maintained energized by two alternative holding circuits, one of which provides a shunt around the switch 32 and includes switch 30, a wire 35, a holding switch 36, a wire 37, a double throw switch 40, wires 41, 34 to the solenoid 26. The second alternative holding circuit includes switch 30, wire 35, switch 36, wire 37, switch 40 and wires 43, 33, thermostat T and wire 34 to the solenoid.

The holding switch 36 includes a contact bar 44 attached to the armature 25 and arranged to close on two fixed contacts when the armature is raised by energization of the solenoid.

The switches 30, 32 and 40 are actuated in response to pressure changes in the high pressure side of the refrigerating system. These switches may be of any suitable form, and in the present disclosure they are enclosed in a housing 45 and are actuated by expansion and contraction of a metal bellows 46 supported in the housing. The bellows 46 is connected by a tube 47 to the conduit 14 in the high pressure side of the refrigerating system so that the expansion and contraction of the bellows varies in accordance with changes in pressure in the high side of the refrigerating system. The switches 30, 32 and 40 are of the snap actuated type and are operated by an actuating member 50 interconnecting the switch mechanisms with the movable wall of the bellows 46. Any suitable conventional snap acting switch mechanisms may be employed, and to avoid needless details, the switch mechanisms are shown schematically. Suffice to say, the switch 30 includes a pivoted movable contact 51 which closes on a fixed contact 52. Contact 51 is connected with line L1 and contact 52 is connected with wire 31. The contact actuating mechanism is adjusted so that contact 51 moves from contact 52 when the refrigerant pressure in conduit 14 reaches 400 p.s.i. and closes on contact 52 when the pressure is reduced to 300 p.s.i. In the refrigerating system described, 400 p.s.i. is considered excessive and the system should be shut down.

The switch 32 includes a pivoted movable contact 53 which is adapted to engage a fixed contact 54 when the switch is closed. Contact 53 is connected with wire 31 and contact 54 is connected with wire 33. The actuating mechanism is adjusted so that the contact 53 is moved from contact 54 when the refrigerant pressure in conduit reaches 255 p.s.i. and closes on contact 54 when the pressure reduces to 150 p.s.i. No undue load is imposed on the motor 18 when it is started against 150 p.s.i. head pressure.

The switch 40 includes a pivoted movable contact 55 which is snap moved between fixed contacts 56 and 57. Contact 55 is connected with wire 37, contact 56 is connected with wire 41 and contact 57 is connected with wire 43. The contact actuating mechanism is adjusted so that contact 55 moves substantially instantaneously from contact 56 to contact 57 when the refrigerant pressure in conduit reaches 220 p.s.i. and moves similarly from contact 57 to contact 56 when the pressure reduces to 160 p.s.i.

The thermostat T may be of conventional construction and for sake of brevity it is not shown nor described in detail. Suffice to say, the thermostat comprises a bimetal blade 60, one end of which is anchored to a suitable frame, and is connected with wire 33. The other end of the bimetal 60 carries a contact 61 which engages a fixed contact 62 when the temperature of the bimetal increases to a given level, such as 75° F. The contact 61 is moved from the contact 62 below 75° F.

Normal operation of the refrigerating system is as follows: Assuming that the refrigerating system has been idle a sufficient period for the refrigerant pressure in the conduit 14 to substantially equalize with the pressure in conduit 17, switches 30, 32 will be closed and contact 55 of switch 40 will be closed on contact 56. The contacts 61, 62 of the thermostatic switch T will be separated until such time as the bimetal 60 moves contact 61 into engagement with the contact 62. When this occurs, a circuit is established from L1 through switch 30, wire 31, switch 32, wire 33, thermostat T, wire 34, solenoid 26 to line L2. Energization of the solenoid 26 closes the contactor switch 22 and establishes a power circuit through the compressor motor 18 from L1, wire 20, wire 21, contacts 22, wire 23 to line L2. Simultaneously with the closing of contactor switch 22, the holding switch 36 is closed which establishes the alternate holding circuit for the solenoid 26 from line L1 through switch 30, wires 31, 35, holding switch 36, wire 37, contacts 55, 56 of switch 40, wires 41, 34, solenoid 26 to line L2. This circuit shunts out the thermostat T so that should the contacts of the thermostat T fail to maintain an uninterrupted circuit, because the temperature increase of the bimetal 60 is not sufficient to generate the power required to firmly close the contact 61 on contact 62, such failure will have no effect on the solenoid circuit. The compressor motor 18 will then drive the compressor 11 and immediately increase the pressure of the refrigerant in the pressure conduit 14. When this pressure reaches 220 p.s.i. the contact 55 of switch 40 will shift from contact 56 to contact 57. This switch action places the thermostatic switch T in the second alternative solenoid holding circuit by establishing the circuit from wire 37 to wires 43, 33. Normally, by the time the pressure in the refrigerating system has increased to 220 p.s.i. the bimetal 60 of the thermostat T will have deveoped sufficient pressure between contacts 61, 62 to maintain the circuit through the solenoid 26.

When the high pressure side of the refrigerating system reaches 225 p.s.i. the switch 32 will open. This switch opening does not affect the energization of the solenoid 26 inasmuch as the switch 32 has been shunted by the holding switch 36 through wire 35 and is out of the solenoid circuit. The refrigerating system then operates to cool the air of the room in which the thermostat T is located until the thermostat breaks the solenoid circuit.

In the event that there is a momentary power failure in lines L1, L2 for any cause, the solenoid will be deenergized, thereby causing contactor switch 22 to open the compressor motor circuit and the holding switch 36 to open the holding circuit for the solenoid. When power is resumed in lines L1, L2 the solenoid circuit cannot be reestablished because switch 32 will remain open until such time as the pressure in the high pressure side of the refrigerating system is reduced to 150 p.s.i. It will be noted that prior to reclosing of the switch 32, the contact 55 of switch 40 will have shifted from contact 57 to contact 56. This switching occurs when the pressure in the high pressure side of the system falls to 10 p.s.i. above that pressure at which the switch 32 recloses. This assures that when the system is restarted the pressure switch 40 will be in its starting circuit position. At that time, assuming that the contacts 61, 62 of the thermostat T is still closed and calling for air cooling, the solenoid circuit will be reestablished as described previously.

Should the circuit for the solenoid 26 be momentarily interrupted because of manual opening and reclosing of the thermostat contacts 61, 62, a delay in restarting the compressor will occur in the same manner as just described.

It will be seen that the refrigerating system will only be energized after conditions are such that the system can start without undue loading of the compressor motor.

In the event pressure in excess of 400 p.s.i. is developed in the refrigerating system, the switch 30 will interrupt the circuitry of the solenoid 26 and the refrigerating system cannot be restarted at least until switch 32 recloses. The restarting of the system will be the same as described hereinbefore.

I claim:

1. In a refrigerating system of the compressor-condenser-expander type having an electric motor driven compressor, a control system for the motor comprising, an electric powered switching device including a power element and adapted to close an energizing circuit for said motor when said power element is energized and to de-energize said motor when said power element is deenergized, characterized by an energizing circuit for said power element comprising a condition responsive switch and a first switch in series, circuit means to maintain said power element energized irrespective of the operation of said first switch and including a holding switch operative to close and open in response to energization and deenergization of said power element and operative when closed to establish a holding energizing circuit for said power element around said first switch, said holding circuit including two alternative circuits in series with said holding switch, one of said alternative circuits including a second switch means and a circuit around said condition responsive switch, the second alternative circuit including a third switch means and said condition responsive switch in series circuit and means for substantially simultaneously opening said second switch means and closing said third switch means and vice versa, means to open said first switch in response to an operating condition in said refrigerating system, and means for substantially simultaneously opening said second switch means and closing said third switch means after said first switch opens.

2. A refrigerating system as defined in claim 1 further characterized by means to close said first switch means in response to decrease in refrigerant pressure in the high pressure side of said refrigerating system from normal operating pressures and to open said first switch means in response to an increase in said refrigerant pressure to said normal operating pressure.

3. A refrigerating system as defined in claim 1 further characterized by means to open said second switch means in response to an increase in pressure of refrigerant in the high side of said refrigerating system to a pressure lower than the refrigerant pressure at which said first switch means is opened.

4. A refrigerating system as defined in claim 3 further characterized by means to close said third switch means substantially simultaneously with the opening of said second switch.

5. A refrigerating system as defined in claim 3 further characterized by said second and third switch means including a common movable contact and spaced contacts alternatively engaged by said movable contact.

6. A refrigerating system as defined in claim 5 further characterized by said means for opening said first switch and for opening said second switch means and closing said third switch means comprising a single bellows adapted to respond to changes in refrigerant pressures in the high pressure side of said refrigerating system.

References Cited

UNITED STATES PATENTS

| | | | |
|---|---|---|---|
| 3,110,160 | 11/1963 | Minen | 62—228 |
| 3,312,081 | 4/1967 | Berger | 62—158 |
| 3,321,669 | 5/1967 | Rhodes | 62—158 |
| 3,358,468 | 12/1967 | Shaw | 62—158 |

MEYER PERLIN, Primary Examiner

U.S. Cl. X.R.

62—209, 228; 318—484